(12) United States Patent
Cheng et al.

(10) Patent No.: US 9,804,368 B2
(45) Date of Patent: Oct. 31, 2017

(54) NEAR-INFRARED HYBRID LENS SYSTEMS WITH WIDE FIELD OF VIEW

(71) Applicant: OmniVision Technologies, Inc., Santa Clara, CA (US)

(72) Inventors: Tingyu Cheng, New Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/875,051

(22) Filed: Oct. 5, 2015

(65) Prior Publication Data

US 2017/0097499 A1   Apr. 6, 2017

(51) Int. Cl.
*G02B 13/18* (2006.01)
*G02B 13/14* (2006.01)
*G02B 1/04* (2006.01)
*G02B 9/12* (2006.01)
*G02B 13/00* (2006.01)

(52) U.S. Cl.
CPC .............. *G02B 13/14* (2013.01); *G02B 1/041* (2013.01); *G02B 9/12* (2013.01); *G02B 13/006* (2013.01); *G02B 13/0035* (2013.01); *G02B 13/0085* (2013.01)

(58) Field of Classification Search
CPC . G02B 1/00; G02B 1/041; G02B 9/00; G02B 9/12; G02B 13/00; G02B 13/001; G02B 13/0015; G02B 13/0035; G02B 13/006; G02B 13/0085; G02B 13/14
See application file for complete search history.

(56) References Cited

U.S. PATENT DOCUMENTS

| | | | |
|---|---|---|---|
| 8,194,334 B2 * | 6/2012 | Hsu | G02B 13/0035 359/754 |
| 9,377,603 B1 * | 6/2016 | Cheng | G02B 13/0085 |
| 2010/0315724 A1 * | 12/2010 | Fukuta | G02B 13/0035 359/716 |
| 2011/0013070 A1 * | 1/2011 | Hirao | G02B 7/008 348/340 |
| 2012/0242413 A1 * | 9/2012 | Lesso | H03F 1/0227 330/297 |

FOREIGN PATENT DOCUMENTS

CN   101387737 B   8/2011
CN   103199097 B   3/2016

OTHER PUBLICATIONS

Taiwan Patent Application No. 105128829; English Translation of Office Action dated Apr. 18, 2017; 8 pages.

* cited by examiner

*Primary Examiner* — Thong Nguyen
(74) *Attorney, Agent, or Firm* — Lathrop Gage LLP

(57) ABSTRACT

A near-infrared hybrid lens system for imaging a wide field-of-view scene onto an image plane includes (a) a first cast lens positioned closest to the scene and at least partly transmissive to near-infrared light, (b) a second cast lens positioned closest to the image plane and at least partly transmissive to near-infrared light, and (c) a wafer-level lens at least partly transmissive to near-infrared light and disposed between the first cast lens and the second cast lens, wherein the wafer-level lens has (i) a planar substrate with a first surface facing away from the image plane and a second surface facing the image plane, (ii) a first lens element disposed on the first surface, and (iii) a second lens element disposed on the second surface.

18 Claims, 9 Drawing Sheets

700

```
┌─────────────────────────────────────────────────────┐
│ FORM PLURALITY OF FIRST LENS ELEMENTS OF FIRST      │
│ MATERIAL ON FIRST SURFACE OF WAFER                  │
│ 710                                                 │
└─────────────────────────────────────────────────────┘
                         │
                         ▼
┌─────────────────────────────────────────────────────┐
│ FORM PLURALITY OF SECOND LENS ELEMENTS OF SECOND    │
│ MATERIAL ON SECOND SURFACE OF WAFER, OPTIONALLY     │
│ SECOND MATERIAL IS DIFFERENT FROM FIRST MATERIAL    │
│ 720                                                 │
└─────────────────────────────────────────────────────┘
                         │
                         ▼
┌─────────────────────────────────────────────────────┐
│ SINGULATE A PLURALITY OF WAFER-LEVEL LENSES FROM    │
│ THE WAFER                                           │
│ 730                                                 │
└─────────────────────────────────────────────────────┘
```

```
┌─────────────────────────────────────────────────────┐
│ DISPOSE RESIN IN MOLD HAVING SHAPE COMPLIMENTARY    │
│ TO LENS SHAPE                                       │
│ 810                                                 │
└─────────────────────────────────────────────────────┘
                         │
                         ▼
┌─────────────────────────────────────────────────────┐
│ HARDEN MATERIAL IN MOLD TO FORM CAST LENS           │
│ 820                                                 │
└─────────────────────────────────────────────────────┘
                         │
                         ▼
┌─────────────────────────────────────────────────────┐
│ RELEASE CAST LENS FROM MOLD                         │
│ 830                                                 │
└─────────────────────────────────────────────────────┘
```

FIG. 8

NEAR-INFRARED HYBRID LENS SYSTEMS WITH WIDE FIELD OF VIEW

BACKGROUND

Near-infrared cameras are used in a variety of applications, typically associated with imaging in low-light conditions. These applications include night-time surveillance and traffic monitoring, both of which benefit from a wide field of view (FOV). In surveillance, the wide FOV makes it possible to monitor a large area with a single camera. In traffic monitoring, a vehicle may be equipped with one or more cameras that image surroundings of the vehicle to, e.g., avoid collisions when driving at night. In some applications, the scene is illuminated with one or more light-emitting diodes emitting near-infrared light. A camera sensitive to near-infrared light then images this illumination light as it is scattered off of objects in the scene.

Most conventional wide FOV lens systems include a large number of lens elements and lens surfaces, for example six lens elements with eleven lens surfaces/interfaces. This allows for incorporating, into a single lens system, many different materials having diverse indices of refraction so as to properly propagate wide-angle rays through the lens system. Typically, the lens (or lenses) closest to the scene has a very large diameter in order to collect and guide these wide-angle rays.

SUMMARY

Disclosed herein are near-infrared, wide field-of-view (FOV) hybrid lens systems that combine a wafer-level lens with two cast lenses in a compact package to image a wide FOV scene in the near-infrared spectral range. These near-infrared, wide FOV hybrid lens systems are well-suited for incorporation into compact camera modules used, for example, in portable devices or in other devices subject to tight spatial constraints.

In an embodiment, a near-infrared hybrid lens system for imaging a wide field-of-view scene onto an image plane includes a first cast lens positioned closest to the scene and at least partly transmissive to near-infrared light. The lens system further includes a second cast lens positioned closest to the image plane and at least partly transmissive to near-infrared light. In addition, the lens system includes a wafer-level lens at least partly transmissive to near-infrared light and disposed between the first cast lens and the second cast lens. The wafer-level lens has (i) a planar substrate with a first surface facing away from the image plane and a second surface facing the image plane, (ii) a first lens element disposed on the first surface, and (iii) a second lens element disposed on the second surface.

BRIEF DESCRIPTION OF THE DRAWINGS

FIG. 7 illustrates a method for forming a plurality of wafer-level lenses, according to an embodiment.

FIG. 8 illustrates a method for producing a cast lens, according to an embodiment.

DETAILED DESCRIPTION OF THE EMBODIMENTS

Figure 1:
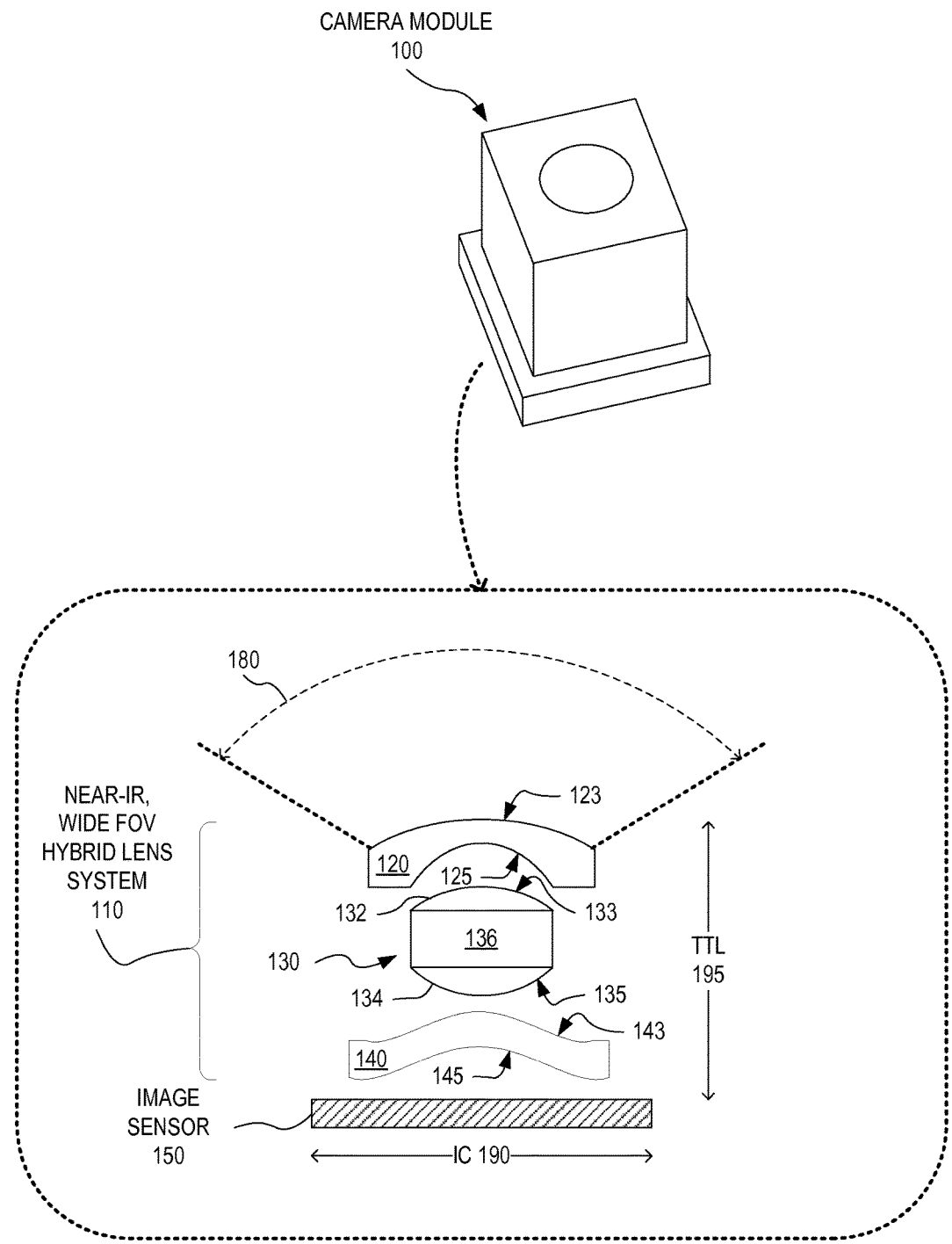
FIG. 1 illustrates a near-infrared, wide FOV hybrid lens system implemented in an exemplary camera device, according to an embodiment.

FIG. 1 illustrates one exemplary near-infrared, wide FOV hybrid lens system 110 implemented in one exemplary camera module 100. Camera module 100 is, for example, a camera cube configured for implementation in a portable device, such as a mobile phone, or in another device subject to tight spatial constraints. However, camera module 100 may be another type camera device without departing from the scope hereof. Near-infrared, wide FOV hybrid lens system 110 is coupled with an image sensor 150 in camera module 100. Near-infrared, wide FOV hybrid lens system 110 has a wide FOV characterized by a FOV angle 180. In one embodiment, FOV angle 180 is at least 140 degrees. Near-infrared, wide FOV hybrid lens system 110 is configured to operate in the near-infrared spectral range. In one embodiment, near-infrared, wide FOV hybrid lens system 110 is configured to operate in the spectral range from about 825 nanometers (nm) to about 875 nm. In another embodiment, near-infrared, wide FOV hybrid lens system 110 is configured to operate in at least a portion of the near-infrared spectral range from 800 nm to about 2500 nm.

Near-infrared, wide FOV hybrid lens system 110 includes a first cast lens 120, a wafer-level lens 130, and a second cast lens 140. First cast lens 120, wafer-level lens 130 and second cast lens 140 are optically coupled in series to image a scene onto an image plane. In camera module 100, the image plane of near-infrared, wide FOV hybrid lens system 110 substantially coincides with image sensor 150. Each of first cast lens 120, wafer-level lens 130, and second cast lens 140 is at least partly transmissive to near-infrared light. Image sensor 150 is, for example, a complementary-metal-oxide semiconductor (CMOS) image sensor, a charged coupled device (CCD), or another focal plane array sensitive to light in the near-infrared spectral range. First cast lens 120 has lens surfaces 123 and 125 respectively facing away from and toward the image plane of near-infrared, wide FOV hybrid lens system 110. Wafer-level lens 130 includes lens elements 132 and 134 disposed on opposing sides of a substrate 136. Lens element 132 has a lens surface 133 facing away from the image plane of near-infrared, wide FOV hybrid lens system 110. Lens element 134 has a lens surface 135 facing the image plane of near-infrared, wide FOV hybrid lens system 110. Second cast lens 140 has lens surfaces 143 and 145 respectively facing away from and toward the image plane of near-infrared, wide FOV hybrid lens system 110.

Each of cast lenses 120 and 140 is integrally formed, that is, formed from one material and in one piece. Hence, each of cast lenses 120 and 140 is composed of a single material throughout. However, one or both of cast lenses 120 and 140 may include one or more surface coatings, such as an antireflective coating, without departing from the scope hereof. Such a coating is applied to the cast lens subsequent to casting of the lens.

Cast lenses 120 and 140 may be manufactured at very low cost, for example using injection molding techniques. Wafer-level lens 130 benefits from wafer-level mass-production methods to enable even lower manufacturing cost than those associated with cast lenses 120 and 140. Furthermore, wafer-level production of wafer-level lens 130 allows for lens elements 132 and 134 to be made from a different material than that of substrate 136, as well as for lens elements 132 and 134 to be made from two different materials, respectively. Such additional freedom of material choices, as compared to a cast lens, provides additional flexibility to achieve desired performance characteristics of wafer-level lens 130. In an embodiment, lens elements 132 and 134 are made from a different material than the material of substrate 136. However, not all lens shapes are compatible with wafer-level manufacturing. For example, not all lens shapes are capable of accommodating a planar substrate between the two lens surfaces. Near-infrared, wide FOV hybrid lens system 110 includes cast lenses 120 and 140 to achieve certain lens shapes that are incompatible with wafer-level manufacturing, or at least impractical to produce at the wafer level. At least in part by virtue of these lens shapes, cast lenses 120 and 140 cooperate with wafer-level lens 130 to image a wide FOV in a compact package. In FIG. 1, the image circle of near-infrared, wide FOV hybrid lens system 110 is represented by the diameter 190 of the image circle (IC). In one embodiment, each of first cast lens 120, wafer-level lens 130, and second cast lens 140 has diameter less than IC diameter 190. This is in stark contrast to conventional near-infrared, wide FOV lens systems, wherein the lens closest to the scene has a diameter that greatly exceeds the image circle diameter. As a result, near-infrared, wide FOV hybrid lens system 110 may be combined with image sensor 150 in a camera module 100 that is significantly smaller than the package required when using a conventional near-infrared, wide FOV lens system. Near-infrared, wide FOV hybrid lens system 110 is therefore well-suited for incorporation into embodiments of camera module 100 having a small form factor. In an embodiment, each of first cast lens 120, wafer-level lens 130, and second cast lens 140 has diameter less than 2.0 mm.

In an embodiment, the total track length (shown in FIG. 1 as TTL 195) of near-infrared, wide FOV hybrid lens system 110 is similar to or less than IC diameter 190, which allows for incorporation of near-infrared, wide-FOV hybrid lens system 110 into small form factor embodiments of camera module 100. TTL 195 is for example about 2.6 millimeters (mm) or less than 3.0 mm, and IC diameter 190 is about 2.4 millimeters. In one embodiment, TTL 195 is less than 1.1 times IC diameter 190.

Herein, the "image circle" of a lens system refers to a collection or set of the farthest positions, with respect to the position of the optical axis, that the cone of light transmitted by the lens system can reach on the image plane. For axially symmetric lens systems such as those disclosed herein, this collection or set describes a circle on the image plane. The image circle is defined herein as the circle that coincides with full width at half maximum of the cone at the image plane. Herein, "total track length" of a lens system refers to the greatest distance, parallel to the optical axis of the lens system, from the image plane of the lens system to the lens surface farthest from the image plane.

Although shown in FIG. 1 as having side length matching IC diameter 190, the side length of image sensor 150 may be different from IC diameter 190. In one example, all of image sensor 150 is within IC diameter 190 such that the image formed on image sensor 150 by near-infrared, wide FOV hybrid lens system 110 is free or at least nearly free of vignetting. In another example, at least a portion of the image circle characterized by IC diameter 190 is within image sensor 150, such that images captured by image sensor 150 exhibit some degree of vignetting.

Figure 2:
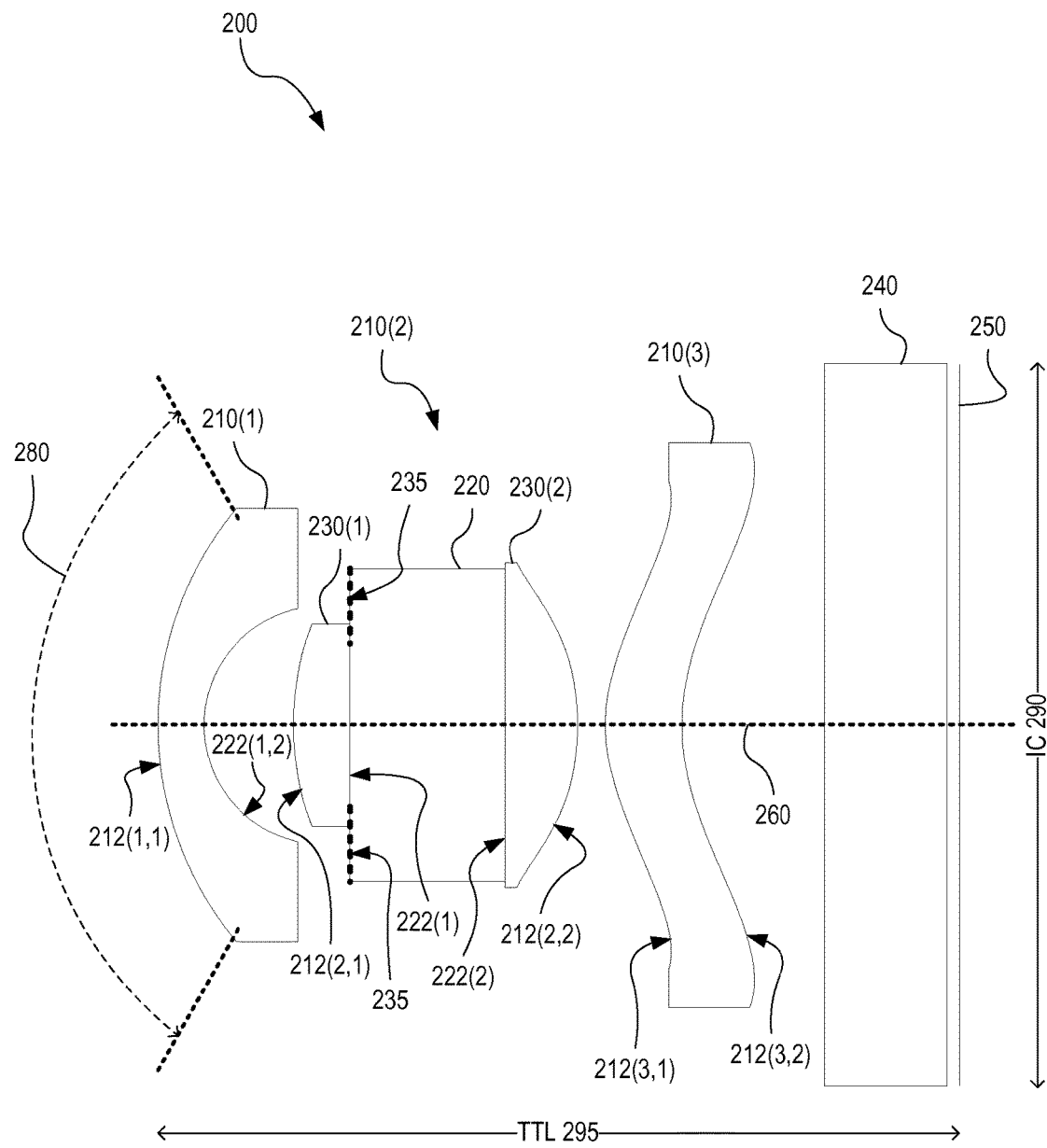
FIG. 2 illustrates one embodiment of the near-infrared, wide FOV hybrid lens system of FIG. 1.

FIG. 2 illustrates one exemplary near-infrared, wide FOV hybrid lens system 200 that includes a first cast lens 210(1), a wafer-level lens 210(2), and a second cast lens 210(3) optically coupled in series. Near-infrared, wide FOV hybrid lens system 200 illustrates, by non-limiting example, the beneficial concepts discussed in connection with FIG. 1. While particular values of parameters for near-infrared, wide FOV hybrid lens system 200 are disclosed, actual values may deviate from the disclosed values. A disclosed parameter value is a particular example of a range of values and may be extended to such a range of values. Near-infrared, wide FOV hybrid lens system 200 is an embodiment of near-infrared, wide FOV hybrid lens system 110. Wafer-level lens 210(2) is an embodiment of wafer-level lens 130. Cast lenses 210(1) and 210(3) are embodiments of cast lenses 120 and 140, respectively.

Near-infrared, wide FOV hybrid lens system 200 is configured to image a scene onto an image plane 250 with a cover glass 240 placed between near-infrared, wide FOV hybrid lens system 200 and image plane 250. Cover glass 240 is, for example, made of glass, plastic, or a combination thereof. Near-infrared, wide FOV hybrid lens system 200 has a total track length 295 and forms an image circle 290 on image plane 250. Near-infrared, wide FOV hybrid lens system 200 has a FOV indicated by FOV angle 280. FIG. 2 further indicates the optical axis 260 of near-infrared, wide FOV hybrid lens system 200.

Cast lens 210(1) has a convex lens surface 212(1,1) and a concave lens surface 212(1,2) respectively facing away from and toward image plane 250. Both of lens surfaces 212(1,1) and 212(2,2) are spherical, thus simplifying manufacture of cast lens 210(1). Wafer-level lens 210(2) includes lens elements 230(1) and 230(2), and a substrate 220. Lens elements 230(1) and 230(2) are embodiments of lens elements 132 and 134, respectively. Substrate 220 is an embodiment of substrate 136. Substrate 220 has a substantially planar surface 222(1), facing away from image plane 250, and a substantially planar surface 222(2) facing image plane 250. Lens elements 230(1) and 230(2) are disposed on surfaces 222(1) and 222(2), respectively. Lens element 230(1) has a convex lens surface 212(2,1) facing away from image plane 250. Lens element 230(2) has a convex lens surface 212(2,2) facing image plane 250. Cast lens 210(3) has lens surfaces 212(3,1) and 212(3,2) respectively facing away from and toward image plane 250. Cast lens 210(3) is gull-wing shaped, and each of lens surfaces 212(3,1) and 212(3,2) include both convex and concave portions. All of lens surfaces 212(2,1), 212(2,2), 212(3,1), and 212(3,2) are aspheric.

The interface between lens element 230(1) and substrate 220 at surface 222(1) includes an aperture stop. In one embodiment, this aperture stop is a physical object, such as an opaque coating, indicated by dashed lines 235. The aperture stop may have extent different from that indicated by dashed lines 235. In another embodiment, the diameter of lens surface 212(2,1), together with the propagation angles of rays propagating from lens surface 212(2,1) to surface 222(1), defines an aperture stop at the interface between lens element 230(1) and surface 222(1). In yet another embodiment, the diameter of lens element 230(1) at surface 222(1) defines the aperture stop.

Without departing from the scope hereof, the diameter of substrate 220 may be larger than shown in FIG. 2. Also, the diameter of lens element 230(1) may be greater than shown in FIG. 2, in which case an aperture may be disposed on surface 222(1) to form the aperture stop. Also without departing from the scope hereof, lens elements 230(1) and 230(2), and cast lenses 210(1) and 210(3) may have larger diameters than illustrated in FIG. 2, although the optical performance presented below assumes optically active areas as illustrated in FIG. 2.

Convex lens surface 212(1,1) collects incident rays and directs those rays into near-infrared, wide FOV hybrid lens system 200. Concave lens surface 212(1,2) and convex lens surface 212(2,1) cooperate to adjust the propagation direction of rays collected by convex lens surface 212(1,1) to guide these rays through the aperture stop at the interface between lens element 230(1) and surface 222(1). Convex lens surface 212(2,2) delivers rays, passing through the stop aperture, to lens surface 212(3,1). The stop aperture at the interface between lens element 230(1) and surface 222(1) serves to maintain, at least to a certain degree, the symmetry of each ray bundle respectively associated with a field location, such that the angular spread of a ray bundle before wafer-level lens 210(2) is similar to the angular spread of the corresponding ray bundle after wafer-level lens 210(2). Cast lens 210(3) bends bundles of rays, received from convex lens surface 212(2,2), to reach image plane 250. Lens surfaces 212(2,2), 212(3,1), and 212(3,2) cooperate to balance optical aberrations, especially distortion, astigmatism, and coma.

Tables 1A and 1B lists the lens data of near-infrared, wide FOV hybrid lens system 200. The lens data includes values of design parameters for all lens surfaces 212, cast lens 210(1), lens elements 230(1) and 230(2), substrate 220, and cast lens 210(3). The lens data also includes the aperture stop (STO) location, configuration of cover glass (CG) 240, and a gap between cover glass 240 and image plane (IMA) 250. In addition, an assumed object location (OBJ) is listed together with a virtual surface located at lens surface 212 (1,1). The diameters of the object (OBJ) and the virtual surface defines a FOV angle of 140 degrees. Material properties and thicknesses of each of cast lens 210(1), lens elements 230(1) and 230(2), substrate 220, cast lens 210(3), and cover glass 240 are indicated in Table 1A in the same row as the first surface of the respective element, as viewed from the object side. Material properties indicated in Table 1A are (a) the index of refraction $n_D$ at the Fraunhofer D-line $\lambda_D$=589.3, and (b) the Abbe number. The Abbe number is a measure of optical dispersion in a material and is defined as $V_d=(n_D-1)/(n_F-n_C)$, where $n_F$ and $n_C$ are the indices of refraction at the Fraunhofer F-line $\lambda_F$=486.1 nm and the Fraunhofer C-line $\lambda_C$=656.3 nm, respectively.

Table 1B lists the aspheric coefficients of each of lens surfaces 212(2,1), 212(2,2), 212(3,1), and 212(3,2). For each of these aspheric lens surfaces, the surface profile can be expressed as $$Z(s) = \frac{Cs^2}{1+\sqrt{1-(1+k)C^2s^2}} + A_4 s^4 + A_6 s^6 + \ldots,$$

where Z is the surface sag parallel to optical axis 260 as a function of the radial distance s from optical axis 260, C is the inverse of the radius of curvature, k is the conic constant, and $A_4$, $A_6$, . . . are the $4^{th}$, $6^{th}$, . . . order aspheric terms.

Near-infrared, wide FOV hybrid lens system 200 has a working F-number of 2.1, and IC 290 of 2.408 mm, and TTL 295 of 2.62 mm. It follows that TTL=1.09×IC for near-infrared, wide FOV hybrid lens system 200.

As evident from Table 1A, lens elements 230(1) and 230(2) have the same material properties in terms of index of refraction and Abbe number. However, the material of cast lens 210(1) is different from that of lens elements 230(1) and 230(2), and the material of cast lens 210(3) is different from those of cast lens 210(1) and lens elements 230(1) and 230(2). In one example, cast lenses 210(1) and 210(3) are made from glass, such as SCHOTT glass. In another example, at least one of cast lenses 210(1) and 210(3) is made from a plastic or another optical material at least partly transmissive to near-infrared light. Lens elements 230(1) and 230 (2) may be made from a polymer such as an epoxy.

The projection of the outer diameter of lens surface 212(1,1) onto optical axis 260 is optically downstream from the location of lens surface 212(1,2) at optical axis 260. Thus, it is not possible to manufacture cast lens 210(1) as a substrate-based wafer-level lens. In the case of cast lens 210(3), the projection onto optical axis 260 of the portion of lens surface 212(3,1) closest to image plane 250 is only about 40 microns upstream from the location of lens surface 212(3,2) at optical axis 260. Hence, it is not practical to produce cast lens 210(3) at the wafer-level (in a manner similar to wafer-level lens 210(2)), since the substrate of such a wafer-level lens would need to have thickness less than 50 microns. Accordingly, the design of near-infrared, wide FOV hybrid lens system 200 relies on cast lenses 210(1) and 210(3) being produced by casting.

The diameter of cast lens 210(3) is less than the diameter of IC 290, and the diameter of each of cast lens 210(1) and wafer-level lens 210(2) is less than the diameter of cast lens 210(3). This allows for packaging of near-infrared, wide FOV hybrid lens system 200 with image sensor 150 in a compact camera module 100, wherein the radial extent of the packaging of camera module 100 away from optical axis 260 is defined by image sensor 150 as opposed to by one or more lenses of near-infrared, wide FOV hybrid lens system 200.

The radius of curvature R3 of lens surface 212(2,1) is such that R3/EFFL≥0.122, wherein EFFL is the effective focal length of near-infrared, wide FOV hybrid lens system 200. This inequality may help minimize distortion aberration. Furthermore, the radii of curvature of lens surfaces 212 (1,2), 212(2,1), 212(2,2), and 212(3,2) are such that −1.4>R4/R2>−0.25, −0.9>R3/R4>−1.55, and −0.95>R4/R6>−1.5, wherein R2, R4, and R6 are the radii of curvature of lens surfaces 212(1,2), 212(2,2), and 212(3,2), respectively. These relations describe that constraints of radii of curvature constraining near-infrared, wide FOV hybrid lens system 200 relative to the radius of curvature (R4) of lens surface 212(2,2). Lens surface 212(2,2) is the lens surface causing the greatest distortion aberration.

TABLE 1A

| Surface | Radius of curvature [mm] | Thickness [mm] | $n_D$ | $V_d$ | Diameter [mm] |
|---|---|---|---|---|---|
| OBJ | Infinity | 350.00 | | | 1961.38 |
| Virtual surface | Infinity | 0.00 | | | 2.85 |
| 212(1, 1) | 1.110 | 0.15 | 1.59 | 61.20 | 1.42 |
| 212(1, 2) | 0.390 | 0.29 | | | 0.76 |
| 212(2, 1) | 0.999 | 0.18 | 1.59 | 31.24 | 0.66 |
| 222(1)/STO | Infinity | 0.51 | 1.52 | 62.60 | 0.48 |
| 222(2) | Infinity | 0.24 | 1.59 | 31.24 | 1.02 |
| 212(2, 2) | −0.947 | 0.09 | | | 1.06 |
| 212(3, 1) | 0.544 | 0.25 | 1.63 | 23.40 | 1.61 |
| 212(3, 2) | 0.750 | 0.47 | | | 1.85 |
| CG | Infinity | 0.40 | 1.52 | 62.60 | 2.11 |
| Gap | Infinity | 0.04 | | | 2.37 |
| IMA 250 | Infinity | | | | 2.408 |

TABLE 1B

| | Aspheric coefficient | | | | | | |
|---|---|---|---|---|---|---|---|
| Surface | k | $A_4$ | $A_6$ | $A_8$ | $A_{10}$ | $A_{12}$ | $A_{14}$ |
| 212(2, 1) | −1.8251 | 0.0000 | 0.3055 | 2.3473 | −2.8841 | 26.1819 | −0.3194 |
| 212(2, 2) | 0.4514 | 0.0000 | −2.3462 | 14.1875 | −39.5524 | 62.4880 | −0.0891 |
| 212(3, 1) | −5.7308 | 0.0000 | 0.4037 | −1.5326 | 1.8296 | −1.2417 | 0.0864 |
| 212(3, 2) | −0.5790 | 0.0000 | −0.5687 | −0.2077 | 0.3081 | −0.2416 | 0.0000 |

FIGS. 3A, 3B, 3C, and 3D show the optical performance of near-infrared, wide FOV hybrid lens system 200 (FIG. 2), as evaluated by the Zemax® Optical Design Program. FIGS. 3A, 3B, 3C, and 3D show spherical aberration, f-theta distortion, field curvature, and lateral color, respectively, of near-infrared, wide FOV hybrid lens system 200, assuming location of object (OBJ) and image plane (IMA) 250 as indicated in Table 1A. As demonstrated by FIGS. 3A, 3B, 3C, and 3D, near-infrared, wide FOV hybrid lens system 200 produces an image on image plane 250 of high optical quality.

Figure 3A:
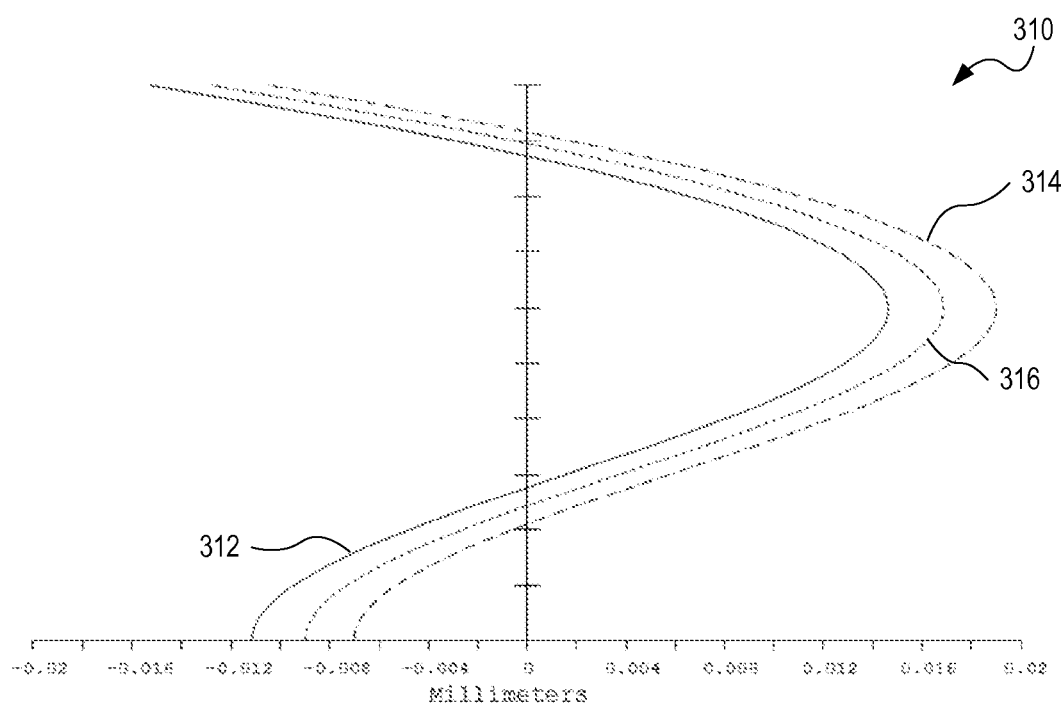
FIG. 3A is a plot of the longitudinal spherical aberration of the near-infrared, wide FOV hybrid lens system of FIG. 2.

FIG. 3A is a plot of the longitudinal spherical aberration of near-infrared, wide FOV hybrid lens system 200. FIG. 3A shows the longitudinal spherical aberration in millimeters, displayed on the horizontal axis, as a function of entrance pupil height, displayed on the vertical axis. The vertical axis extends from optical axis 260 to the most extreme radial distance from optical axis 260 associated with FOV angle 280. The maximum entrance pupil radius is $r_p$=0.1931 mm. Longitudinal spherical aberration curves 312 (solid line), 314 (dashed line), and 316 (dash-dot line) are computed at 825 nm, 850 nm, and 875 nm, respectively.

Figure 3B:
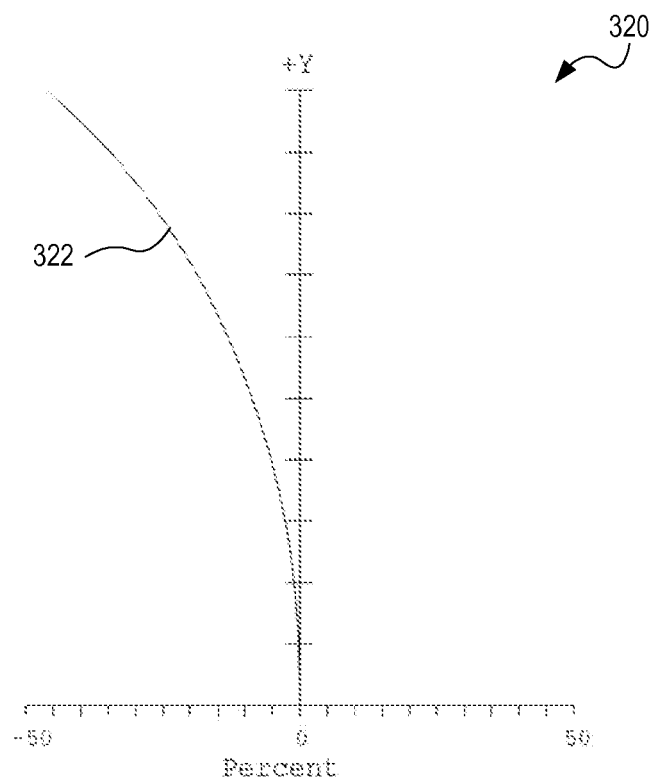
FIG. 3B is a plot of the f-theta distortion of the near-infrared, wide FOV hybrid lens system of FIG. 2.

FIG. 3B is a plot of the f-theta distortion of near-infrared, wide FOV hybrid lens system 200. FIG. 3B shows the f-theta distortion in percent, displayed on the horizontal axis, as a function of field angle, displayed on the vertical axis. The vertical axis extends from optical axis 260 to the most extreme location bounded by FOV angle 280. Thus, the maximum field angle plotted in FIG. 3B is $\theta_{max}$=70.342°. The distortion is computed at 825 nm, 850 nm, and 875 nm, all of which coincide at distortion curve 322.

Figure 3C:
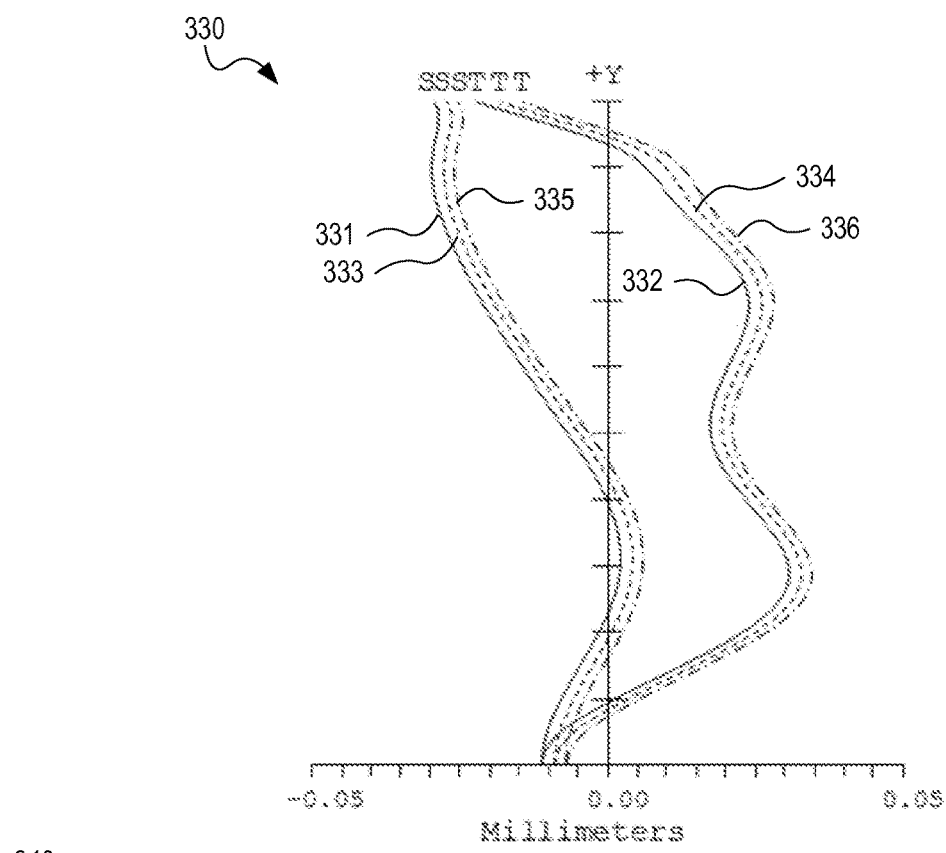
FIG. 3C is a plot of the Petzval field curvature of the near-infrared, wide FOV hybrid lens system of FIG. 2.

FIG. 3C is a plot of the Petzval field curvature of near-infrared, wide FOV hybrid lens system 200. The field curvature is plotted in millimeters, displayed on the horizontal axis, for field angles between zero and $\theta_{max}$=70.342°, displayed on the vertical axis. Field curvature 331 and field curvature 332 are computed at 825 nm in the sagittal and tangential planes, respectively. Field curvature 333 and field curvature 334 are computed at 850 nm in the sagittal and tangential planes, respectively. Field curvature 335 and field curvature 336 correspond to field curvature at 875 nm in the sagittal and tangential planes, respectively.

Figure 3D:
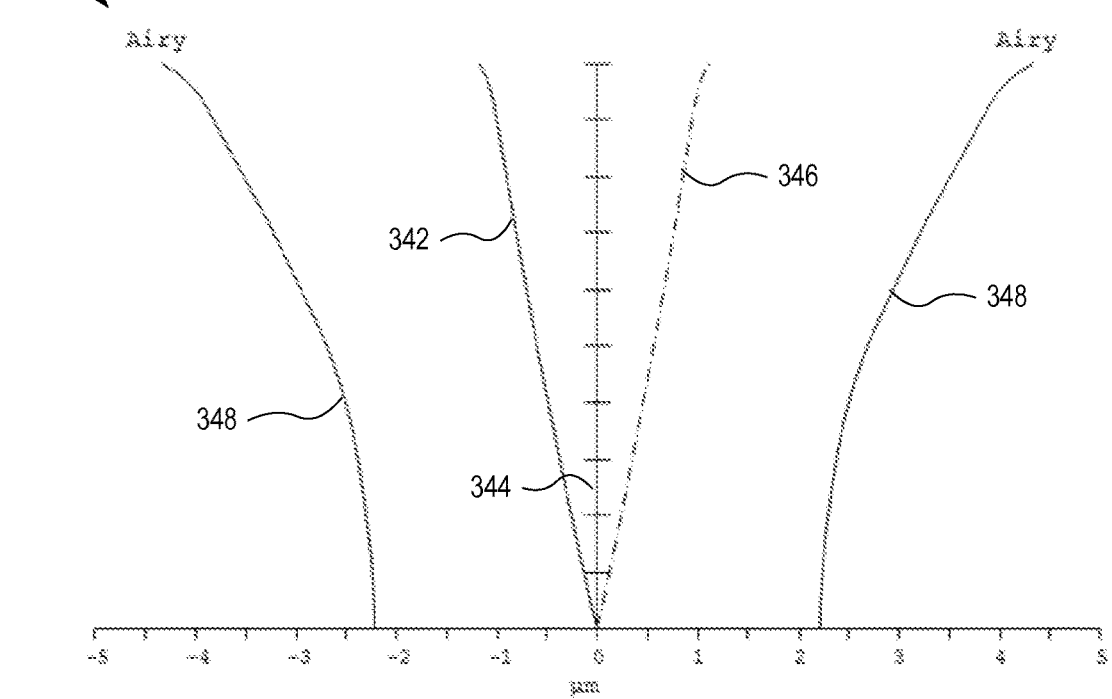
FIG. 3D is a plot of the lateral color error for the near-infrared, wide FOV hybrid lens system of FIG. 2.

FIG. 3D is a plot of the lateral color error, also known as transverse chromatic aberration, for near-infrared, wide FOV hybrid lens system 200. FIG. 3D shows the lateral color error in microns, displayed on the horizontal axis, as a function of field height, displayed on the vertical axis. The vertical axis extends from optical axis 260 to the most extreme radial distance from optical axis 260 associated with IC 290. Field height ranges from $h_{min}$=0 (on-axis) to $h_{max}$=1.200 mm. Lateral color is referenced to 850 nm, such that the lateral color 344 for 850 nm is zero for all field heights. Lateral color 342 is computed at 825 nm. Lateral color 346 is computed at 875 nm. The lateral color error is significantly less than the Airy disk radius 348 for the range of field heights evaluated.

Figure 4:
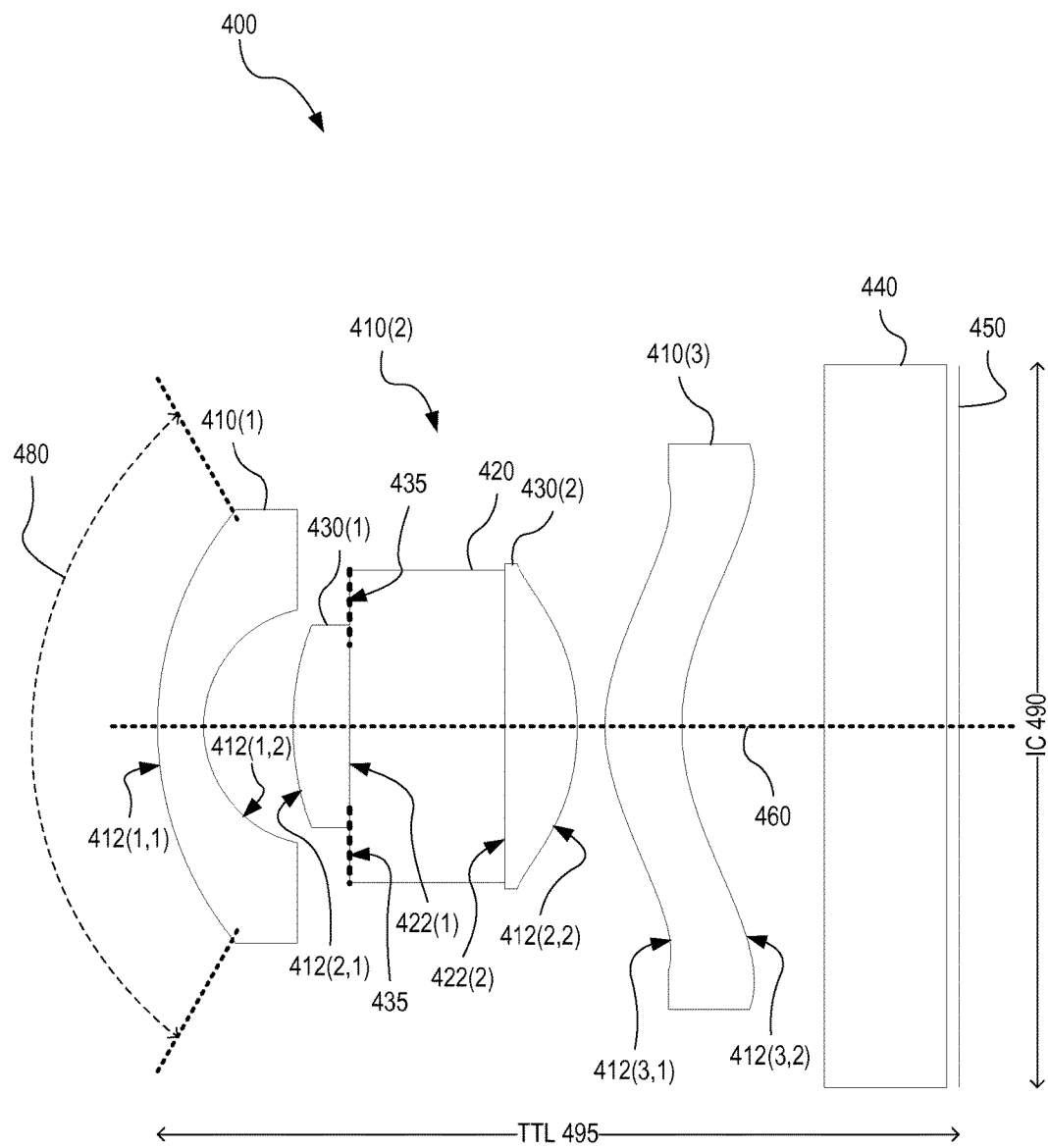
FIG. 4 illustrates another embodiment of the near-infrared, wide FOV hybrid lens system of FIG. 1.

FIG. 4 illustrates another exemplary near-infrared, wide FOV hybrid lens system 400 that includes a first cast lens 410(1), a wafer-level lens 410(2), and a second cast lens 410(3) optically coupled in series. Near-infrared, wide FOV hybrid lens system 400 illustrates, by non-limiting example, the beneficial concepts discussed in connection with FIG. 1. While particular values of parameters for near-infrared, wide FOV hybrid lens system 400 are disclosed, actual values may deviate from the disclosed values. A disclosed parameter value is a particular example of a range of values and may be extended to such a range of values. Near-infrared, wide FOV hybrid lens system 400 is an embodiment of near-infrared, wide FOV hybrid lens system 110. Wafer-level lens 410(2) is an embodiment of wafer-level lens 130. Cast lenses 410(1) and 410(3) are embodiments of cast lenses 120 and 140, respectively.

Near-infrared, wide FOV hybrid lens system 400 is configured to image a scene onto an image plane 450 with a cover glass 440 placed between near-infrared, wide FOV hybrid lens system 400 and image plane 450. Cover glass 440 is, for example, made of glass, plastic, or a combination thereof. Near-infrared, wide FOV hybrid lens system 400 has a total track length 495 and forms an image circle 490 on image plane 450. Near-infrared, wide FOV hybrid lens system 400 has a FOV indicated by FOV angle 480. FIG. 4 further indicates the optical axis 460 of near-infrared, wide FOV hybrid lens system 400.

Cast lens 410(1) has a convex lens surface 412(1,1) and a concave lens surface 412(1,2) respectively facing away from and toward image plane 450. Both of lens surfaces 412(1,1) and 412(1,2) are spherical, thus simplifying manufacture of cast lens 410(1). Wafer-level lens 410(2) includes lens elements 430(1) and 430(2), and a substrate 420. Lens elements 430(1) and 430(2) are embodiments of lens elements 132 and 134, respectively. Substrate 420 is an embodiment of substrate 136. Substrate 420 has a substantially planar surface 422(1), facing away from image plane 450, and a substantially planar surface 422(2) facing image plane 450. Lens elements 430(1) and 430(2) are disposed on surfaces 422(1) and 422(2), respectively. Lens element 430(1) has a convex lens surface 412(2,1) facing away from image plane 450. Lens element 430(2) has a convex lens surface 412(2,2) facing image plane 450. Cast lens 410(3) has lens surfaces 412(3,1) and 412(3,2) respectively facing away from and toward image plane 450. Cast lens 410(3) is gull-wing shaped, and each of lens surfaces 412(3,1) and 412(3,2) include both convex and concave portions. All of lens surfaces 412(2,1), 412(2,2), 412(3,1), and 412(3,2) are aspheric.

The interface between lens element 430(1) and substrate 420 at surface 422(1) includes an aperture stop. In one embodiment, this aperture stop is a physical object, such as an opaque coating, indicated by dashed lines 435. The aperture stop may have extent different from that indicated by dashed lines 435. In another embodiment, the diameter of lens surface 412(2,1), together with the propagation angles of rays propagating from lens surface 412(2,1) to surface 422(1), defines an aperture stop at the interface between lens element 430(1) and surface 422(1). In yet another embodiment, the diameter of lens element 430(1) at surface 422(1) defines the aperture stop.

Without departing from the scope hereof, the diameter of substrate 420 may be larger than shown in FIG. 4. Also, the diameter of lens element 430(1) may be greater than shown in FIG. 4, in which case an aperture may be disposed on surface 422(1) to form the aperture stop. Also without departing from the scope hereof, lens elements 430(1) and 430(2), and cast lenses 410(1) and 410(3) may have larger diameters than illustrated in FIG. 4, although the optical performance presented below assumes optically active areas as illustrated in FIG. 4.

Convex lens surface 412(1,1) collects incident rays and directs those rays into near-infrared, wide FOV hybrid lens system 400. Concave lens surface 412(1,2) and convex lens surface 412(2,1) cooperate to adjust the propagation direction of rays collected by convex lens surface 412(1,1) to guide these rays through the aperture stop at the interface between lens element 430(1) and surface 422(1). Convex lens surface 412(2,2) delivers rays, passing through the stop aperture, to lens surface 412(3,1). The stop aperture at the interface between lens element 430(1) and surface 422(1) serves to maintain, at least to a certain degree, the symmetry of each ray bundle respectively associated with a field location, such that the angular spread of a ray bundle before wafer-level lens 410(2) is similar to the angular spread of the corresponding ray bundle after wafer-level lens 410(2). Cast lens 410(3) bends bundles of rays, received from convex lens surface 412(2,2), to reach image plane 450. Lens surfaces 412(2,2), 412(3,1), and 412(3,2) cooperate to balance optical aberrations, especially distortion, astigmatism, and coma.

Tables 2A and 2B lists the lens data of near-infrared, wide FOV hybrid lens system 400. The lens data includes values of design parameters for all lens surfaces 412, cast lens 410(1), lens elements 430(1) and 430(2), substrate 420, and cast lens 410(3). The lens data also includes the aperture stop (STO) location, configuration of cover glass (CG) 440, and a gap between cover glass 440 and image plane (IMA) 450. In addition, an assumed object location (OBJ) is listed together with a virtual surface located at lens surface 412(1,1). The diameters of the object (OBJ) and the virtual surface defines a FOV angle of 140 degrees. Material properties and thicknesses of each of cast lens 410(1), lens elements 430(1) and 430(2), substrate 420, cast lens 410(3), and cover glass 440 are indicated in Table 2A in the same row as the first surface of the respective element, as viewed from the object side. Material properties indicated in Table 2A are (a) the index of refraction $n_D$ at the Fraunhofer D-line $\lambda_D$=589.3, and (b) the Abbe number. Table 2B lists the aspheric coefficients of each of lens surfaces 412(2,1), 412(2,2), 412(3,1), and 412(3,2).

Near-infrared, wide FOV hybrid lens system 400 has a working F-number of 2.1, and IC 490 of 2.408 mm, and TTL 495 of 2.62 mm. It follows that TTL=1.09×IC for near-infrared, wide FOV hybrid lens system 400.

As evident from Table 2A, lens elements 430(1) and 430(2) have the same material properties in terms of index of refraction and Abbe number. However, the material of cast lens 410(1) is different from that of lens elements 430(1) and 430(2), and the material of cast lens 410(3) is different from those of cast lens 410(1) and lens elements 430(1) and 430(2). In one example, cast lenses 410(1) and 410(3) are made from glass, such as SCHOTT glass. In another example, at least one of cast lenses 410(1) and 410(3) is made from a plastic or another optical material at least partly transmissive to near-infrared light. Lens elements 430(1) and 430(2) may be made from a polymer such as an epoxy.

The projection of the outer diameter of lens surface 412(1,1) onto optical axis 460 is optically downstream from the location of lens surface 412(1,2) at optical axis 460. Thus, it is not possible to manufacture cast lens 410(1) as a substrate-based wafer-level lens. In the case of cast lens 410(3), the projection onto optical axis 460 of the portion of lens surface 412(3,1) closest to image plane 450 is only about 40 microns upstream from the location of lens surface 412(3,2) at optical axis 460. Hence, it is not practical to produce cast lens 410(3) at the wafer-level (in a manner similar to wafer-level lens 410(2)), since the substrate of such a wafer-level lens would need to have thickness less than 50 microns. Accordingly, the design of near-infrared, wide FOV hybrid lens system 400 relies on cast lenses 410(1) and 410(3) being produced by casting.

The diameter of cast lens 410(3) is less than the diameter of IC 490, and the diameter of each of cast lens 410(1) and wafer-level lens 410(2) is less than the diameter of cast lens 410(3). This allows for packaging of near-infrared, wide FOV hybrid lens system 400 with image sensor 150 in a compact camera module 100, wherein the radial extent of the packaging of camera module 100 away from optical axis 460 is defined by image sensor 150 as opposed to by one or more lenses of near-infrared, wide FOV hybrid lens system 400.

The radius of curvature R3 of lens surface 412(2,1) is such that R3/EFFL≥0.122, wherein EFFL is the effective focal length of near-infrared, wide FOV hybrid lens system 400. This inequality may help minimize distortion aberration. Furthermore, the radii of curvature of lens surfaces 412(1,2), 412(2,1), 412(2,2), and 412(3,2) are such that −1.4>R4/R2>−0.25, −0.9>R3/R4>−1.55, and −0.95>R4/R6>−1.5, wherein R2, R4, and R6 are the radii of curvature of lens surfaces 412(1,2), 412(2,2), and 412(3,2), respectively. These relations describe that constraints of radii of curvature constraining near-infrared, wide FOV hybrid lens system 400 relative to the radius of curvature (R4) of lens surface 412(2,2). Lens surface 412(2,2) is the lens surface causing the greatest distortion aberration.

TABLE 2A

| Surface | Radius of curvature [mm] | Thickness [mm] | $n_D$ | $V_d$ | Diameter [mm] |
|---|---|---|---|---|---|
| OBJ | Infinity | 350.00 | | | 1955.98 |
| Virtual surface | Infinity | 0.00 | | | 2.88 |
| 412(1, 1) | 1.110 | 0.15 | 1.59 | 61.20 | 1.43 |
| 412(1, 2) | 0.390 | 0.30 | | | 0.76 |
| 412(2, 1) | 1.008 | 0.18 | 1.59 | 31.24 | 0.67 |
| 422(1)/STO | Infinity | 0.51 | 1.52 | 62.60 | 0.48 |
| 422(2) | Infinity | 0.23 | 1.59 | 31.24 | 1.03 |
| 412(2, 2) | −0.942 | 0.09 | | | 1.06 |
| 412(3, 1) | 0.529 | 0.25 | 1.63 | 23.40 | 1.62 |
| 412(3, 2) | 0.736 | 0.47 | | | 1.86 |
| CG | Infinity | 0.40 | 1.52 | 62.60 | 2.11 |
| Gap | Infinity | 0.04 | | | 2.37 |
| IMA 450 | Infinity | | | | 2.408 |

TABLE 2B

| | Aspheric coefficient | | | | | | |
|---|---|---|---|---|---|---|---|
| Surface | k | $A_4$ | $A_6$ | $A_8$ | $A_{10}$ | $A_{12}$ | $A_{14}$ |
| 212(2, 1) | −1.8073 | 0.0000 | 0.3402 | 1.6489 | 5.4263 | −7.5219 | −0.3194 |
| 212(2, 2) | 1.0824 | 0.0000 | −2.4665 | 13.8484 | −38.6642 | 58.5287 | −0.0891 |
| 212(3, 1) | −5.5519 | 0.0000 | .03922 | −1.5224 | 1.8201 | −1.2696 | 0.0864 |
| 212(3, 2) | −0.5952 | 0.0000 | −0.5641 | −0.2142 | 0.3025 | −0.2364 | 0.0000 |

FIGS. 5A, 5B, 5C, and 5D show the optical performance of near-infrared, wide FOV hybrid lens system 400 (FIG. 4), as evaluated by the Zemax® Optical Design Program. FIGS. 5A, 5B, 5C, and 5D show spherical aberration, f-theta distortion, field curvature, and lateral color, respectively, of near-infrared, wide FOV hybrid lens system 400, assuming location of object (OBJ) and image plane (IMA) 450 as indicated in Table 2A. As demonstrated by FIGS. 5A, 5B, 5C, and 5D, near-infrared, wide FOV hybrid lens system 400 produces an image on image plane 450 of high optical quality.

Figure 5A:
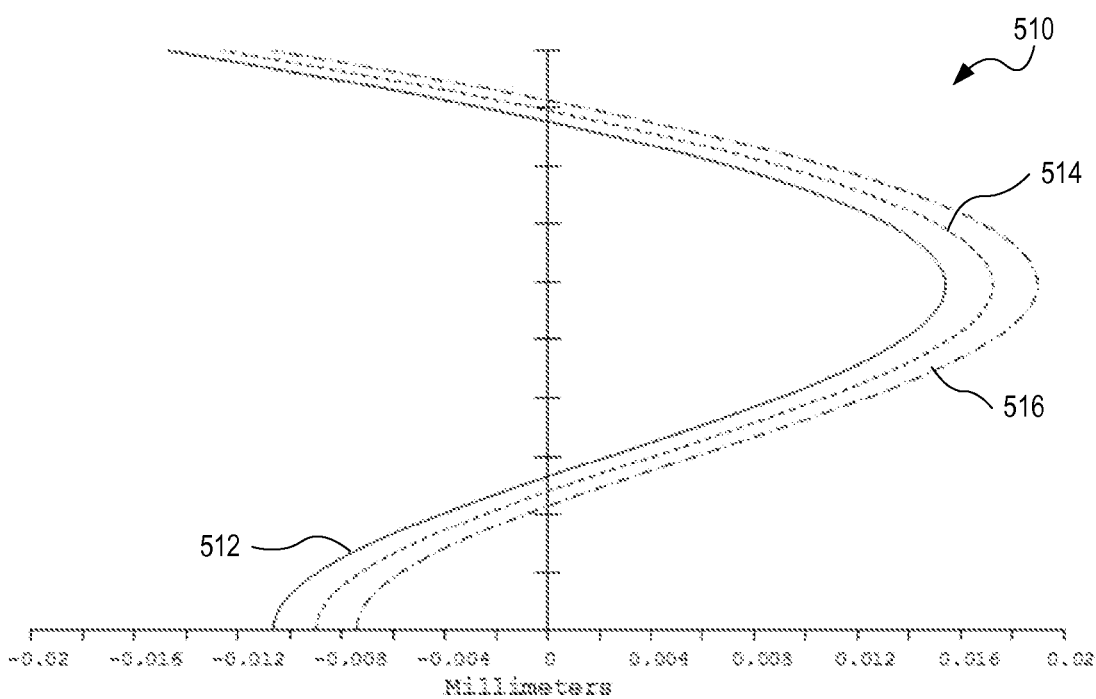
FIG. 5A is a plot of the longitudinal spherical aberration of the near-infrared, wide FOV hybrid lens system of FIG. 4.

FIG. 5A is a plot of the longitudinal spherical aberration of near-infrared, wide FOV hybrid lens system 400. FIG. 5A shows the longitudinal spherical aberration in millimeters, displayed on the horizontal axis, as a function of entrance pupil height, displayed on the vertical axis. The vertical axis extends from optical axis 460 to the most extreme radial distance from optical axis 460 associated with FOV angle 480. The maximum entrance pupil radius is $r_p$=0.1939 mm. Longitudinal spherical aberration curves 512 (solid line), 514 (dashed line), and 516 (dash-dot line) are computed at 825 nm, 850 nm, and 875 nm, respectively.

Figure 5B:
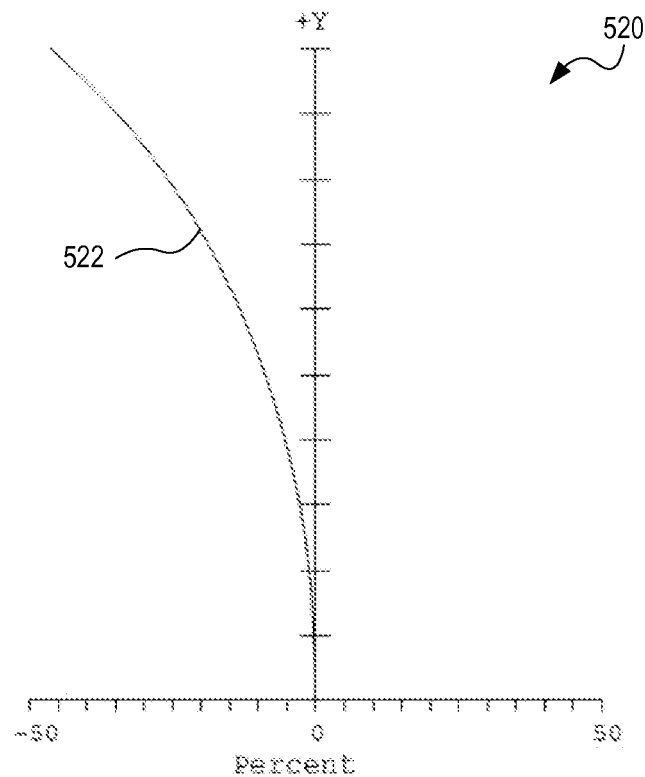
FIG. 5B is a plot of the f-theta distortion of the near-infrared, wide FOV hybrid lens system of FIG. 4.

FIG. 5B is a plot of the f-theta distortion of near-infrared, wide FOV hybrid lens system 400. FIG. 5B shows the f-theta distortion in percent, displayed on the horizontal axis, as a function of field angle, displayed on the vertical axis. The vertical axis extends from optical axis 460 to the most extreme location bounded by FOV angle 480. Thus, the maximum field angle plotted in FIG. 5B is $\theta_{max}$=70.291°. The distortion is computed at 825 nm, 850 nm, and 875 nm, all of which coincide at distortion curve 522.

Figure 5C:
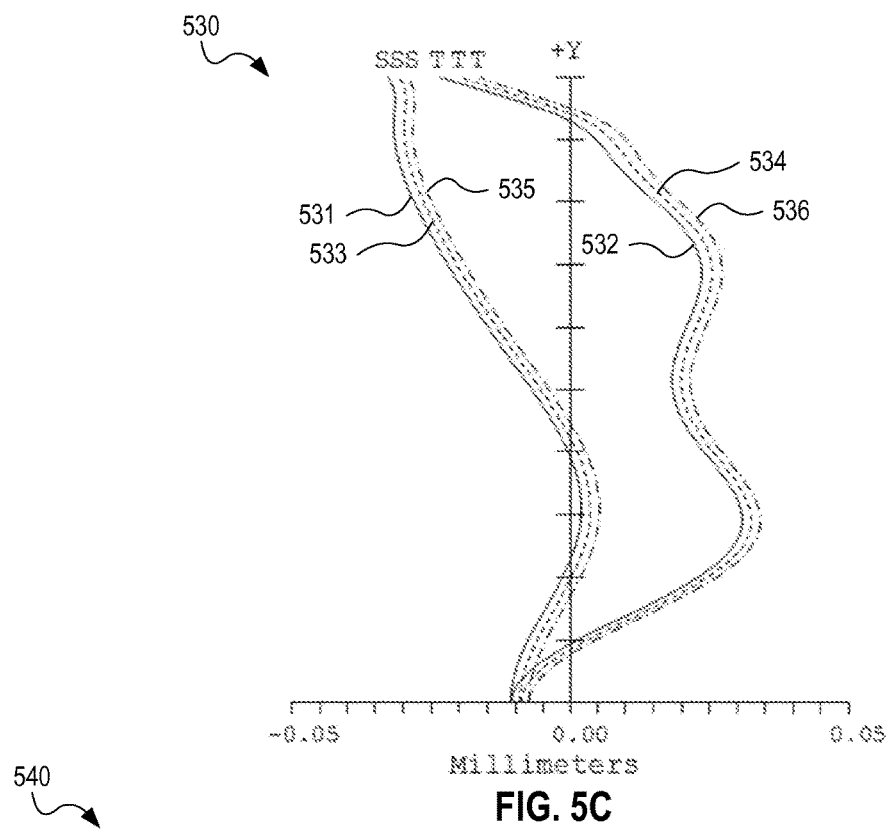
FIG. 5C is a plot of the Petzval field curvature of the near-infrared, wide FOV hybrid lens system of FIG. 4.

FIG. 5C is a plot of the Petzval field curvature of near-infrared, wide FOV hybrid lens system 400. The field curvature is plotted in millimeters, displayed on the horizontal axis, for field angles between zero and $\theta_{max}$=70.291°, displayed on the vertical axis. Field curvature 531 and field curvature 532 are computed at 825 nm in the sagittal and tangential planes, respectively. Field curvature 533 and field curvature 534 are computed at 850 nm in the sagittal and tangential planes, respectively. Field curvature 535 and field curvature 536 correspond to field curvature at 875 nm in the sagittal and tangential planes, respectively.

Figure 5D:
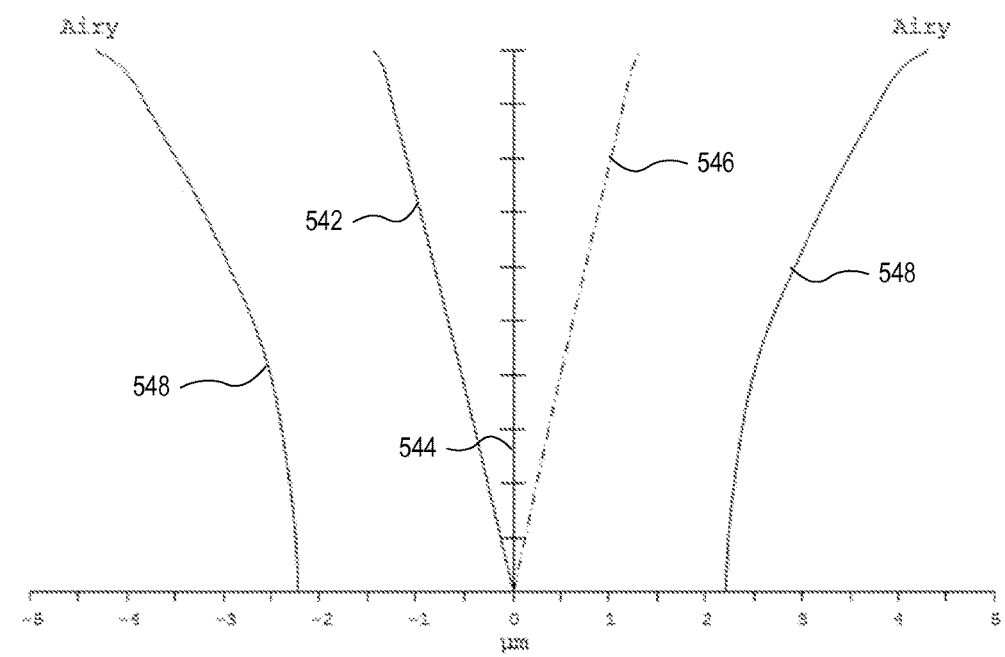
FIG. 5D is a plot of the lateral color error for the near-infrared, wide FOV hybrid lens system of FIG. 4.

FIG. 5D is a plot of the lateral color error, also known as transverse chromatic aberration, for near-infrared, wide FOV hybrid lens system 400. FIG. 5D shows the lateral color error in microns, displayed on the horizontal axis, as a function of field height, displayed on the vertical axis. The vertical axis extends from optical axis 460 to the most extreme radial distance from optical axis 460 associated with IC 490. Field height ranges from $h_{min}$=0 (on-axis) to $h_{max}$=1.200 mm. Lateral color is referenced to 850 nm, such that the lateral color 544 for 850 nm is zero for all field heights. Lateral color 542 is computed at 825 nm. Lateral color 546 is computed at 875 nm. The lateral color error is significantly less than the Airy disk radius 548 for the range of field heights evaluated.

Figure 6:
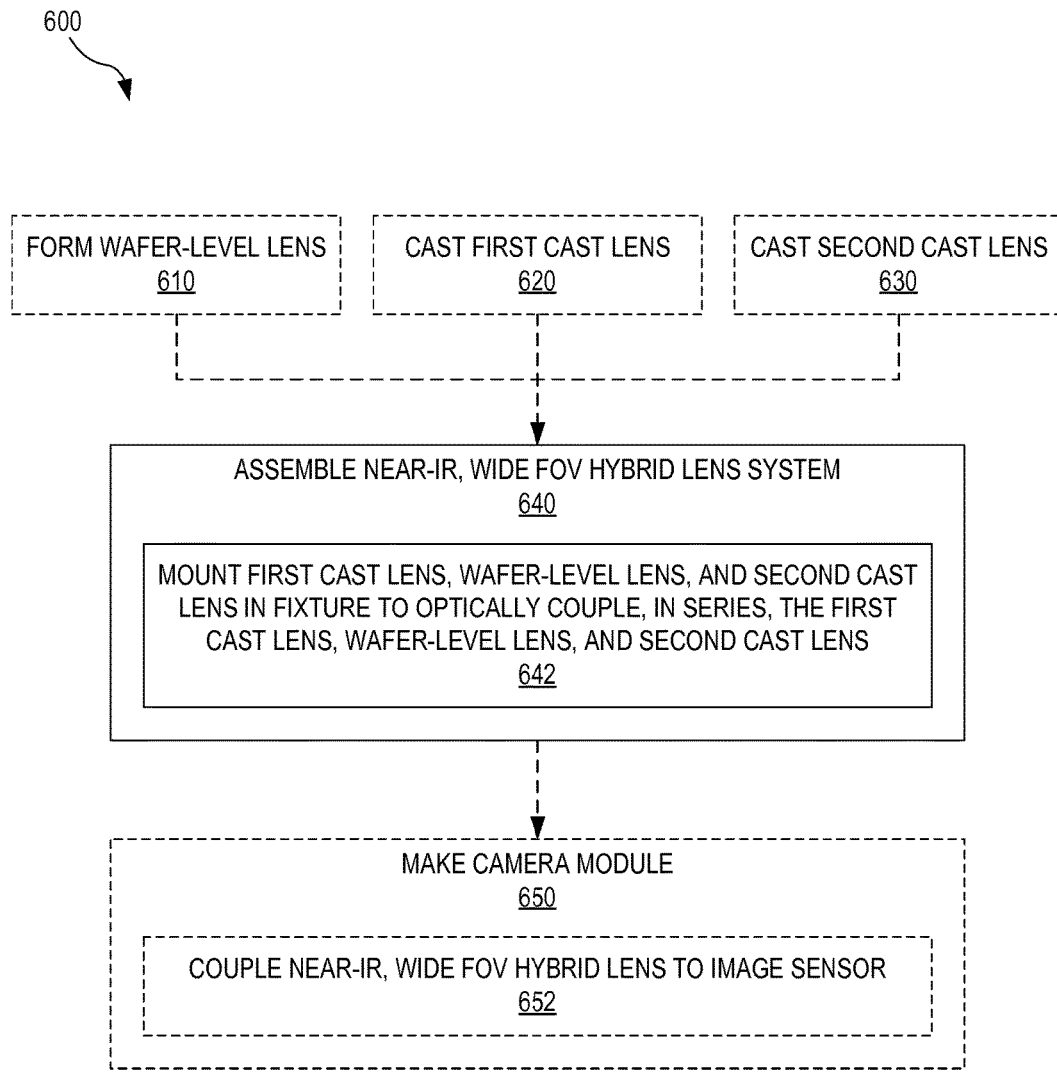
FIG. 6 illustrates a method for manufacturing a near-infrared, wide FOV hybrid lens system, according to an embodiment.

FIG. 6 illustrates one exemplary method 600 for manufacturing near-infrared, wide FOV hybrid lens system 110 (FIG. 1). Method 600 may be used to form near-infrared, wide FOV hybrid lens system 110 according to the lens specification of near-infrared, wide FOV hybrid lens system 200 (FIG. 2) or according to the lens specification of near-infrared, wide FOV hybrid lens system 400 (FIG. 4).

In a step 640, method 600 assembles near-infrared, wide FOV hybrid lens system 110. Step 640 includes a step 642, wherein cast lens 120, wafer-level lens 130, and cast lens 140 are mounted in a fixture. The fixture is configured to place cast lens 120, wafer-level lens 130, and cast lens 140 optically in series, as illustrated in FIG. 1. In one example, step 642 utilizes methods known in the art to mount cast lens 120, wafer-level lens 130, and cast lens 140 in the fixture.

Optionally, step 640 is preceded by steps 610, 620, and 630. In step 610, method 600 forms wafer-level lens 130. In step 620, method 600 casts cast lens 120. In step 630, method 600 casts cast lens 140.

In an embodiment, method 600 further includes a step 650 of making camera module 100 based upon near-infrared, wide FOV hybrid lens system 110. Step 650 includes a step 652 of coupling near-infrared, wide FOV hybrid lens system 110 to image sensor 150 to form camera module 100. In one example, the fixture of step 642 is configured for mounting onto an electronic circuit board that includes image sensor 150.

FIG. 7 illustrates one exemplary method 700 for forming a plurality of wafer-level lenses 130 (FIG. 1). Step 610 of method 600 (FIG. 6) may implement method 700.

In a step 710, a plurality of lens elements 132 are formed on a first surface of a wafer made of the material associated with substrate 136. In one embodiment of step 710, the plurality of lens elements are molded on the first surface of the wafer. For example, a resin (such as a polymer resin) is deposited onto the first surface of the wafer; a mold with a plurality of recesses, each of shape complimentary to lens surface 133, is placed on the first surface (with the resin), the resin is cured, and the mold is removed from the first surface. The resin may be an ultraviolet (UV) curable epoxy that is cured by shining UV light through the wafer to the resin on the first surface.

In a step 720, a plurality of lens elements 134 are formed on a second surface of the wafer of step 710, wherein the second surface is facing away from the first surface. Step 720 may utilize the same method as step 710, however using a mold with a plurality of recesses, each of which have shape complimentary to lens surface 135 and are positioned at the same locations of the wafer as one of the recesses of the mold used in step 710.

In a step 730, a plurality of wafer-level lenses 130 are singulated from the wafer. The wafer is diced, for example using methods known in the art, to form the plurality of wafer-level lenses 130.

FIG. 8 illustrates one exemplary method 800 for producing either one of cast lenses 120 and 140 (FIG. 1). One or both of steps 620 and 630 of method 600 (FIG. 6) may implement method 800.

In a step 810, a molten glass or a resin (such as a polymer resin) is disposed in a mold that has shape complimentary to the shape of the cast lens, i.e., one of cast lenses 120 and 140.

In a step 820, the molten glass or resin is hardened. In one example, steps 810 and 820 utilize a molten glass, which is hardened by cooling. In another example, steps 810 and 820 utilize a UV curable epoxy, and step 820 includes exposing the resin to UV light. Step 820 results in the formation of the cast lens inside the mold.

In a step 830, the mold is opened to release the cast lens therefrom.

Combinations of Features

Features described above as well as those claimed below may be combined in various ways without departing from the scope hereof. For example, it will be appreciated that aspects of one near-infrared, wide FOV hybrid lens systems with wide field of view described herein may incorporate or swap features of another near-infrared, wide FOV hybrid lens systems with wide field of view described herein. The following examples illustrate some possible, non-limiting combinations of embodiments described above. It should be clear that many other changes and modifications may be made to the systems herein without departing from the spirit and scope of this invention:

(A1) A near-infrared hybrid lens system for imaging a wide field-of-view scene onto an image plane may include (a) a first cast lens positioned closest to the scene and at least partly transmissive to near-infrared light (b) a second cast lens positioned closest to the image plane and at least partly transmissive to near-infrared light, and (c) a wafer-level lens at least partly transmissive to near-infrared light and disposed between the first cast lens and the second cast lens.

(A2) In the near-infrared hybrid lens system denoted as (A1), the wafer-level lens may include (a) a planar substrate having a first surface facing away from the image plane and a second surface facing the image plane, (b) a first lens element disposed on the first surface, and (c) a second lens element disposed on the second surface.

(A3) In the near-infrared hybrid lens system denoted as (A2), both of the first lens element and the second lens element of the wafer-level lens may be of a first material.

(A4) In the near-infrared hybrid lens system denoted as (A3), the first material may be different from material of each of the first cast lens and the second cast lens.

(A5) In any of the near-infrared hybrid lens systems denoted as (A2) through (A4), the first lens element may have a convex surface facing away from the image plane, the second lens element having a convex surface facing the image plane.

(A6) In any of the near-infrared hybrid lens systems denoted as (A1) through (A5), each of the first cast lens, the wafer-level lens, and the second cast lens may be at least partly transmissive to light in wavelength range from 825 to 875 nanometers.

(A7) In any of the near-infrared hybrid lens systems denoted as (A1) through (A6), the second cast lens may have smaller diameter than image circle diameter of the near-infrared hybrid lens system.

(A8) In any of the near-infrared hybrid lens systems denoted as (A1) through (A7), each of the first cast lens and the wafer-level lens may have smaller diameter than the second cast lens.

(A9) In any the near-infrared hybrid lens systems denoted as (A1) through (A8), the first cast lens may have a convex surface facing away from the image plane and a concave surface facing the image plane.

(A10) In the near-infrared hybrid lens system denoted as (A9), each of the convex surface and the concave surface may be spherical.

(A11) In any of the near-infrared hybrid lens systems denoted as (A1) through (A10), the second cast lens may be gull-wing shaped.

(A12) In the near-infrared hybrid lens system denoted as (A11), the second cast lens may have a first lens surface facing away from the image plane and a second lens surface facing the image plane, wherein the first lens surface is convex at optical axis of the near-infrared hybrid lens system and the second lens surface is concave at the optical axis.

(A13) In the near-infrared hybrid lens system denoted as (A12), the first cast lens may have a convex surface facing away from the image plane and a concave surface facing the image plane.

(A14) In the near-infrared hybrid lens system denoted as (A12), the wafer-level lens may include (a) a planar substrate having a first surface facing away from the image plane and a second surface facing the image plane, (b) a first lens element disposed on the first surface and having a convex surface facing away from the image plane, and (c) a second lens element disposed on the second surface and having a convex surface facing the image plane.

(A15) In any of the near-infrared hybrid lens systems denoted as (A1) through (A14), the first cast lens may have Abbe number greater than Abbe number of each of (a) the second cast lens and (b) each of a first and second lens element of the wafer-level lens, wherein the first and second lens elements are disposed on two opposite sides of a planar substrate.

(A16) In the near-infrared hybrid lens system denoted as (A15), the second cast lens may have Abbe number greater than Abbe number of each of the first lens element and the second lens element.

(A17) In any of the near-infrared hybrid lens systems denoted as (A1) through (A16), a first lens element of the wafer-level lens may have radius of curvature R3, such that R3/EFFL≥0.122, wherein EFFL is effective focal length of the near-infrared hybrid lens system, wherein the first lens element is disposed on a planar substrate and facing away from the image plane.

(A18) In any of the near-infrared hybrid lens systems denoted as (A1) through (A17), the wafer-level lens may include (a) a planar substrate having a first surface facing away from the image plane and a second surface facing the image plane, (b) a first lens element disposed on the first surface, and (c) a second lens element disposed on the second surface, wherein (a) the first cast lens may have an S2 lens surface facing the image plane and having radius of curvature R2, (b) the first lens element may have an S3 lens surface facing away from the image plane and having radius of curvature R3, (c) the second lens element may have an S4 lens surface facing the image plane and having radius of curvature R4, (d) and the second cast lens may have an S6 lens surface facing the image plane and having radius of curvature R6.

(A19) In the near-infrared hybrid lens system denoted as (A18), the radii of curvature may be such that −1.4>R4/R2>−2.5, −0.9>R3/R4>−1.55, and −0.95>R4/R6>−1.5.

(A20) Any of the near-infrared hybrid lens systems denoted as (A1) through (A19) may have field of view angle of at least 140°.

(A21) Any of the near-infrared hybrid lens system denoted as (A1) through (A20) may have working F-number less than 2.2.

(A22) Any of the near-infrared hybrid lens systems denoted as (A1) through (A21) may have image circle (IC) and total track length (TTL) such that TTL<1.1×IC.

(A23) The near-infrared hybrid lens system denoted as (A22) may have TTL<3.0 millimeters.

(A24) In any of the near-infrared hybrid lens systems denoted as (A1) through (A23), each of the first cast lens, the wafer-level lens, and the second cast lens may have diameter less than 2.0 millimeters.

(A25) In any of the near-infrared hybrid lens systems denoted as (A1) through (A24), the second cast lens may have greater diameter than each of the first cast lens and the wafer-level lens.

Changes may be made in the above systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present system and method, which, as a matter of language, might be said to fall therebetween.

What is claimed is:

1. A near-infrared hybrid lens system for imaging a wide field-of-view scene onto an image plane, comprising:
    a first cast lens positioned closest to the scene and at least partly transmissive to near-infrared light;
    a second cast lens positioned closest to the image plane and at least partly transmissive to near-infrared light; and
    a wafer-level lens at least partly transmissive to near-infrared light and disposed between the first cast lens and the second cast lens, the wafer-level lens including
        (a) a planar substrate having a first surface facing away from the image plane and a second surface facing the image plane,
        (b) a first lens element disposed on the first surface, and
        (c) a second lens element disposed on the second surface;
        wherein the first lens element and the second lens element are of a first material that is different from material of each of the first cast lens and the second cast lens.

2. The near-infrared hybrid lens system of claim 1, each of the first cast lens, the wafer-level lens, and the second cast lens being at least partly transmissive to light in wavelength range from 825 to 875 nanometers.

3. The near-infrared hybrid lens system of claim 1, the second cast lens having smaller diameter than image circle diameter of the near-infrared hybrid lens system, each of the first cast lens and the wafer-level lens having smaller diameter than the second cast lens.

4. The near-infrared hybrid lens system of claim 1, the first cast lens having a convex surface facing away from the image plane and a concave surface facing the image plane.

5. The near-infrared hybrid lens system of claim 4, each of the convex surface and the concave surface being spherical.

6. The near-infrared hybrid lens system of claim 1, the first lens element having a convex surface facing away from the image plane, the second lens element having a convex surface facing the image plane.

7. The near-infrared hybrid lens system of claim 1, the second cast lens being gull-wing shaped.

8. The near-infrared hybrid lens system of claim 7, the second cast lens having a first lens surface facing away from the image plane and a second lens surface facing the image plane, the first lens surface being convex at optical axis of the near-infrared hybrid lens system, the second lens surface being concave at the optical axis.

9. The near-infrared hybrid lens system of claim 8,
    the first cast lens having a convex surface facing away from the image plane and a concave surface facing the image plane;
    the first lens element having a convex surface facing away from the image plane; and
    the second lens element having a convex surface facing the image plane.

10. The near-infrared hybrid lens system of claim 1, the first cast lens having Abbe number greater than Abbe number of each of the second cast lens, the first lens element, and the second lens element.

11. The near-infrared hybrid lens system of claim 10, Abbe number of the second cast lens being smaller than Abbe number of each of the first lens element and the second lens element.

12. The near-infrared hybrid lens system of claim 1,
    the first cast lens having an S2 lens surface facing the image plane, the S2 lens surface having radius of curvature R2;
    the first lens element having an S3 lens surface facing away from the image plane, the S3 lens surface having radius of curvature R3;
    the second lens element having an S4 lens surface facing the image plane, the S4 lens surface having radius of curvature R4; and
    the second cast lens having an S6 lens surface facing the image plane, the S6 lens surface having radius of curvature R6;
    wherein −1.4>R4/R2>−2.5, −0.9>R3/R4>−1.55, and −0.95>R4/R6>−1.5.

13. The near-infrared hybrid lens system of claim 1, having field of view angle of 140°.

14. The near-infrared, hybrid lens system of claim 13, having working F-number less than 2.2.

15. The near-infrared hybrid lens system of claim 13, having image circle (IC) and total track length (TTL) such that TTL/IC<1.1.

16. The near-infrared hybrid lens system of claim 15, having TTL<3.0 millimeters.

17. The near-infrared hybrid lens system of claim 16, each of the first cast lens, the wafer-level lens, and the second cast lens having diameter less than 2.0 millimeters.

18. The near-infrared hybrid lens system of claim 17, the second cast lens having greater diameter than each of the first cast lens and the wafer-level lens.

* * * * *